(12) United States Patent
French et al.

(10) Patent No.: US 10,382,987 B2
(45) Date of Patent: Aug. 13, 2019

(54) IDENTIFYING THE NETWORK SEGMENT RESPONSIBLE FOR POOR AUDIO QUALITY

(71) Applicant: International Business Machines Corporation, Armonk, NY (US)

(72) Inventors: Paul B. French, Cork (IE); Niall J. Lucey, Cork (IE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/474,109

(22) Filed: Mar. 30, 2017

(65) Prior Publication Data

US 2018/0288634 A1 Oct. 4, 2018

(51) Int. Cl.
*H04W 24/08* (2009.01)
*H04W 24/04* (2009.01)

(52) U.S. Cl.
CPC ........... *H04W 24/08* (2013.01); *H04W 24/04* (2013.01)

(58) Field of Classification Search
CPC ..... H04L 43/08; H04L 41/147; H04L 41/142; H04W 24/04; H04W 24/08; H04W 24/02; H04W 64/003; H04W 84/042; H04M 15/41

See application file for complete search history.

(56) References Cited

U.S. PATENT DOCUMENTS

| | | |
|---|---|---|
| 7,397,845 B1 | 7/2008 | Liang |
| 8,755,502 B1 | 6/2014 | Schlesener et al. |
| 2007/0275711 A1 | 11/2007 | Buti et al. |
| 2008/0175167 A1* | 7/2008 | Satyanarayanan .... H04L 41/147 370/254 |
| 2013/0058388 A1 | 3/2013 | Muhammad |
| 2013/0272150 A1* | 10/2013 | Wan ........................ H04L 43/08 370/252 |

FOREIGN PATENT DOCUMENTS

WO WO2007005030 1/2007

OTHER PUBLICATIONS

3GPP Portal, Retrieved from Internet on Mar. 30, 2017, https://portal.3gpp.org/ChangeRequests.aspx?q=1&specnumber=32.298, 1 page.

(Continued)

*Primary Examiner* — George Eng
*Assistant Examiner* — Hung K Du
(74) *Attorney, Agent, or Firm* — Schmeiser, Olsen & Watts, LLP; William Hartwell

(57) ABSTRACT

A method, computer system and computer program product for determining a probability that a particular network segment in a telephony network is responsible for poor audio quality associated with a telephone call being transmitted over the telephony network, is provided. A plurality of parameters associated with a telephone call are identified. The plurality of parameters are indicative of audio quality. A probability that a particular network segment is responsible for poor audio quality associated with the telephone call is calculated based on the plurality of parameters. The probability that a particular network segment is responsible for the poor audio quality associated with the telephone call is a function of at least one of the i) duration of the call and ii) call disconnect time relative to call answer time.

16 Claims, 9 Drawing Sheets

(56) References Cited

OTHER PUBLICATIONS

CDR (Call Detail Record) Decoder Tool, Retrieved from Internet on Mar. 30, 2017, https://www.ibm.com/support/knowledgecenter/en/SSKTXQ_8.5.1/com.ibm.help.sametime.v8512.sut.doc/osv_cdr/osv_cdr_billing_files.html, 2 pages.
BF (Billing Files), Retrieved from Internet on Mar. 30, 2017, https://www.ibm.com/support/knowledgecenter/en/ SSKTXQ_8.5.1/com.ibm.help.sametime.v8512.sut.doc/osv_cdr/osv_cdr_cdr_decoder_tool.html, 2 pages.
Making digital communications work for everyone, Feb. 25, 2016, Retrieved from Internet on Jul. 19, 2016, http://media.ofcom.org.uk/news/2016/digital-comms-review-feb16/, 5 pages.
Newage, Mobile users to get compensation for call drops from Jul. 1, May 16, 2016, Retrieved from Internet on Jul. 19, 2016, http://newagebd.net/230164/mobile-users-to-get-compensation-for-call-d . . . , 8 pages.

\* cited by examiner

IDENTIFYING THE NETWORK SEGMENT RESPONSIBLE FOR POOR AUDIO QUALITY

TECHNICAL FIELD

The present invention relates generally to monitoring audio quality exhibited during a telephone call. More specifically, the present invention is concerned with identifying a network segment responsible for poor audio quality associated with a telephone call.

BACKGROUND

Poor audio quality during a telephone call can be the cause of much user frustration.

SUMMARY

A method, computer system, and computer program product is provided. A processor of a computing system identifies a plurality of parameters associated with a telephone call, wherein the plurality of parameters are indicative of audio quality. A probability that a particular network segment is responsible for poor audio quality associated with the telephone call is calculated based on the plurality of parameters, wherein the probability that a particular network segment is responsible for the poor audio quality associated with the telephone call is a function of at least one of: i) a duration of the call, and ii) a call disconnect time relative to a call answer time.

DETAILED DESCRIPTION

Figure 1:
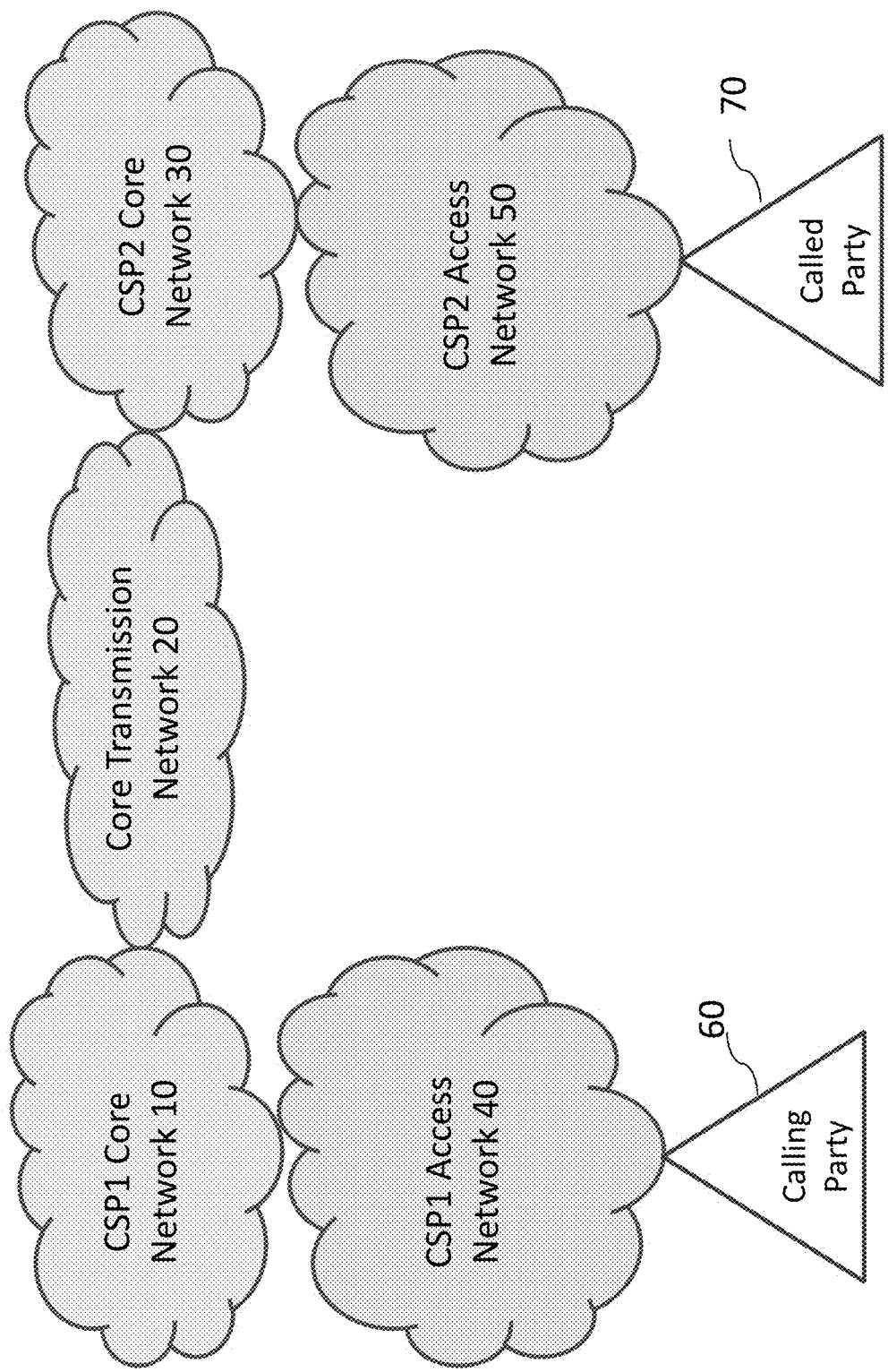
FIG. 1 shows a simplified, exemplary telephony network, in accordance with embodiments of the present invention.

Often, when the quality of a call's audio is bad, one or both parties will abandon the call, disconnect, and immediately call the other party back in an attempt to establish a better connection. Detecting an abandon-and-retry pattern for audio calls is a well-known method of establishing a probability that poor audio quality is being experienced by voice telephony customers. It is know that when a call party is involuntarily dropped, the call party may attempt a call back. Another way of identifying that audio quality is likely to be a problem is by detecting an unusual number of short calls. Another example is monitoring customer complaints.

Additionally, it is known that some country telecoms regulators and consumer groups place sample telephone calls with a view to identifying poor voice quality, particularly where the access is wireless. The conclusions reached as to what is responsible for the poor audio quality may however be flawed.

WO2007005030 describes systems and methods for using distributed network elements to implement monitoring and data collection concerning selected network parameters. This patent therefore discloses the collection of data from a highly instrumented network.

Whilst instrumentation in a telephony network is often used to assist with attributing the voice quality problems to different parts of the network, it is not always useful. For example, Communication Service Providers (CSPs) do not necessarily share internal instrumentation with telecoms regulators, or, even if the CSPs do share the internal instrumentation, telecoms regulators would have extreme difficulties normalizing such instrumentation across multiple equipment vendors, and multiple CSPs, in order to perform an accurate and fair evaluation and comparison.

Receiver reports issued by the Real-Time Transport Control (RTCP) protocol could, in theory, be used to detect voice over IP (VoIP) audio quality issues, for example, audio quality issues due to jitter, but in very many cases such reports are not issued. In other cases, the RTCP protocol does not apply.

Additionally, core network capacity is generally over-provisioned relative to access network capacity, because it is generally cheaper to add resources to the core network rather than to the access network. However, access networks typically have inherent quality challenges (e.g. wireless coverage in the case of wireless access and capacity-limited backhaul between cell sites and the core network). Consequently, voice quality impairments are generally introduced in the access networks. The challenge is to identify which access network is causing the problem, in particular, whether it is the access network serving the calling party or the access network serving the called party.

It is currently possible for CSPs to analyze voice call charging data records and/or call detail records (CDRs) and similar voice call records, whether those records are produced by the network or produced outside of the network, and aggregate that analysis over a large number of records to establish a probability of there being a problem in a CSP's access network. CDRs have been standardized by the 3rd Generation Partnership Project (3GPP) and other bodies. However, embodiments of the present invention do not require the use of a standardized CDR.

Accordingly, embodiments of the present invention relate to a computer-implemented method, system and computer program product for determining a probability that a particular network segment in a telephony network is responsible for poor audio quality associated with a telephone call being transmitted over the telephony network. A plurality of parameters associated with a telephone call are identified. The plurality of parameters are indicative of audio quality. A probability that a particular network segment is responsible for poor audio quality associated with the telephone call is calculated based on the plurality of parameters. The probability that a particular network segment is responsible for the poor audio quality associated with the telephone call is a function of at least one of: i) the duration of the call, and ii) call disconnect time relative to call answer time.

Embodiments of the present invention may apply in case poor audio quality is suspected as being responsible for the disconnect of a telephone call and is used to determine which network segment is likely to be responsible for the poor audio quality.

FIG. 1 shows a simplified, exemplary telephony network, in accordance with embodiments of the present invention. The telephony network comprises CSP's core network 10 which is connected to CSP2's core network 30 by core transmission network 20. A calling party 60 accesses CSP1's core network 10 via access network 40. Similarly, called party 70 accesses CSP2's core network 30 via access network 50. Taking FIG. 1 as an example, a CSP's analysis of CDRs might identify that, in a particular part of CSP1's access network during a given time period, a certain proportion of the calls illustrate evidence of significant voice quality impairments, but many other calls at the same location do not. A conclusion may therefore be reached that the cause of the problem is more likely to exist n the network(s) serving the called parties who are involved in such impaired voice calls.

A problem with this approach is that the approach depends so much on establishing an association between the parties involved in phone calls in CSP1's network. Especially in a wireless network with its varying coverage, it is extremely unusual to have more than one such party sharing enough characteristics to make a comparison feasible. One call party might be close to the cell tower, whilst another call party might be at the cell coverage edge. A call party might suffer from interference whilst another call party might not. One call party might be deep in a large building sheltered by trees with wet leaves whilst another call party might not. So the approach works to an extent, but the approach needs improvement in terms of attributing the cause of the impairment.

An improved method is needed to identify the network segment which is responsible for the poor audio quality and to provide increased confidence in any analytics undertaken.

The solution disclosed herein provides, in accordance with embodiments of the present invention, an improvement over existing methods of establishing a probability regarding which access network is responsible for introducing voice quality impairments, whilst maintaining the advantages of being independent of network-specific instrumentation.

In the case of calls dropped or abandoned early in the call, the solution disclosed can establish, based on a preponderance of evidence, which network segment is responsible for the call drop. Such a determination could be used, for example, to decide whether or not to compensate the party charged for the call (see http://indianexpress.com/article/technology/tech-news-technology/trai-asks-telecom-operators-to-start-compensating-for-call-drops/).

Embodiments of the present invention may exploit the fact that call answer is detectable external to the network and is co-incident with: (a) changing voice paths within the network, and (b) certain typical human behavior. Taking (a) and (b) into account means that an identification can be made as to which network segment is likely to be responsible for the poor audio quality being exhibited by a particular call. Such information can then be aggregated across multiple calls, which can then provide for an improved level of confidence in an overall calculated probability of a general voice quality problem existing at a given CSP's access network. In other words, a probability can be associated with each individual network segment to provide an indication as to how each network segment is performing.

In accordance with embodiments of the present invention, the probability that any given network segment is the source of the voice quality impairment is a function of the call duration, the call answer time, and the call disconnect or abandon/drop time. More specifically, the probability that a particular network segment is responsible for the poor audio quality associated with the telephone call is a function of at least one of: (i) the duration of the call and (ii) the call disconnect time when a call is disconnected relative to call answer e when a call is answered. The term disconnect time as used herein is the time at which there is first evidence of either party disconnecting. The term call duration is the length of the call from when there is first evidence that the call has been placed to when there is first evidence that the call has been disconnected. The call duration refers to how long the call lasts for.

In voice calls, a ring-back tone is invariably inserted at the CSP core network closest to the party being alerted (i.e. the called party). Embodiments of the present invention may exploit the change in call path following answer, and the typical human pattern where the called party issues a greeting following answer and the calling party waits to hear that greeting before saying anything themselves. Calls which are abandoned because of poor audio quality are often abandoned near the beginning of the call. Consequently, it is possible to infer which segments of the network are most likely to be causing an impairment in such calls by examining the relationship between the time they are disconnected or abandoned and the call answer time or absence of answer.

Figure 2:
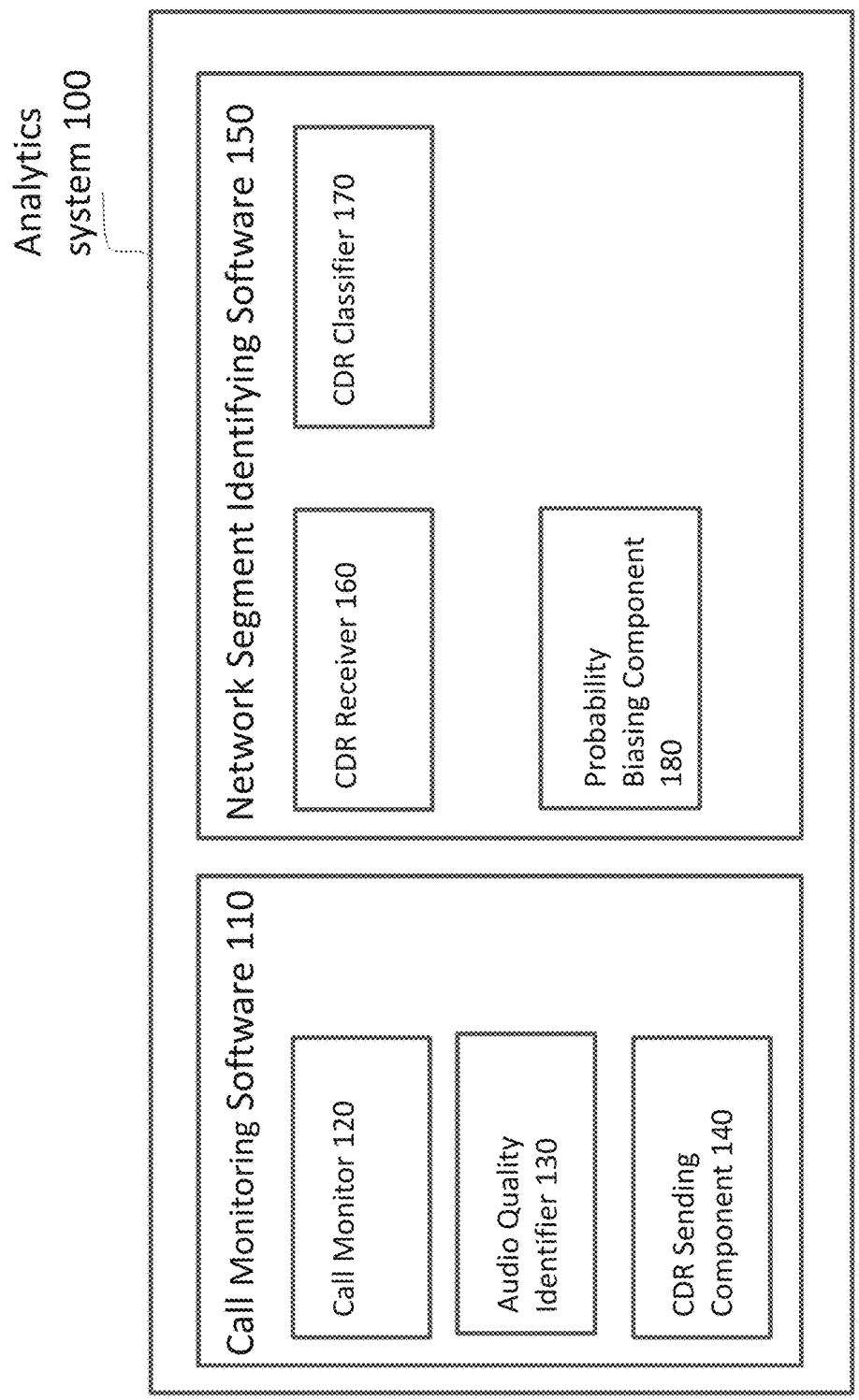
FIG. 2 is a block diagram of an analytics system, in accordance with embodiments of the present invention.
Figure 3:
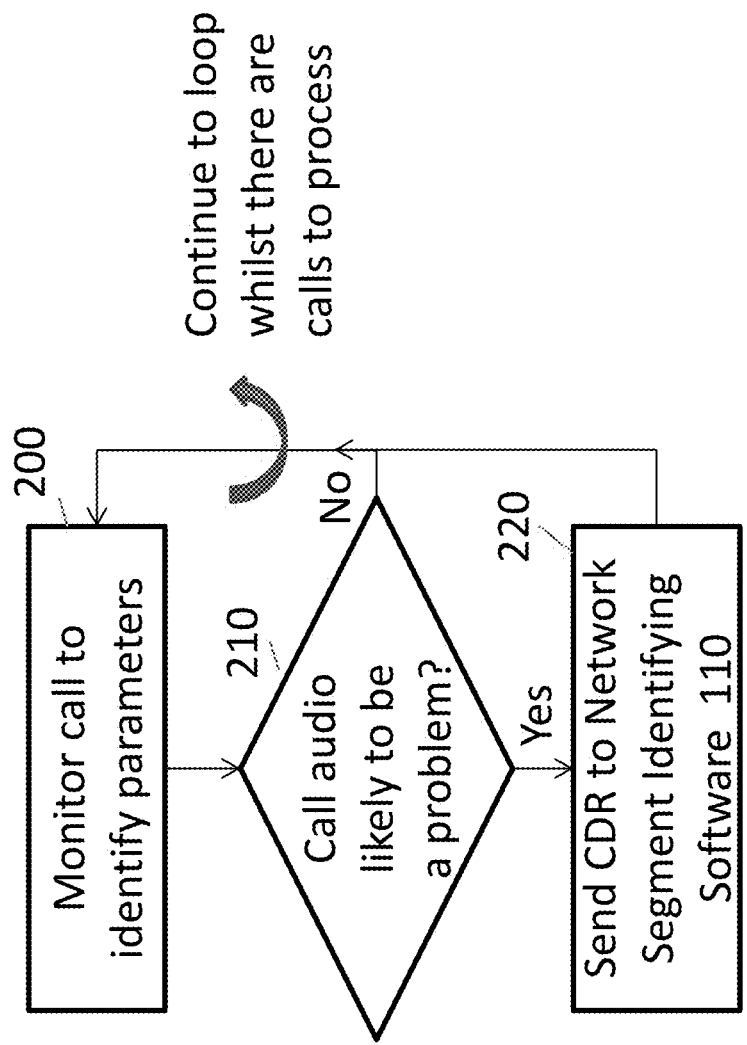
FIG. 3 is a flowchart of a method, in accordance with embodiments of the present invention.
Figure 4:
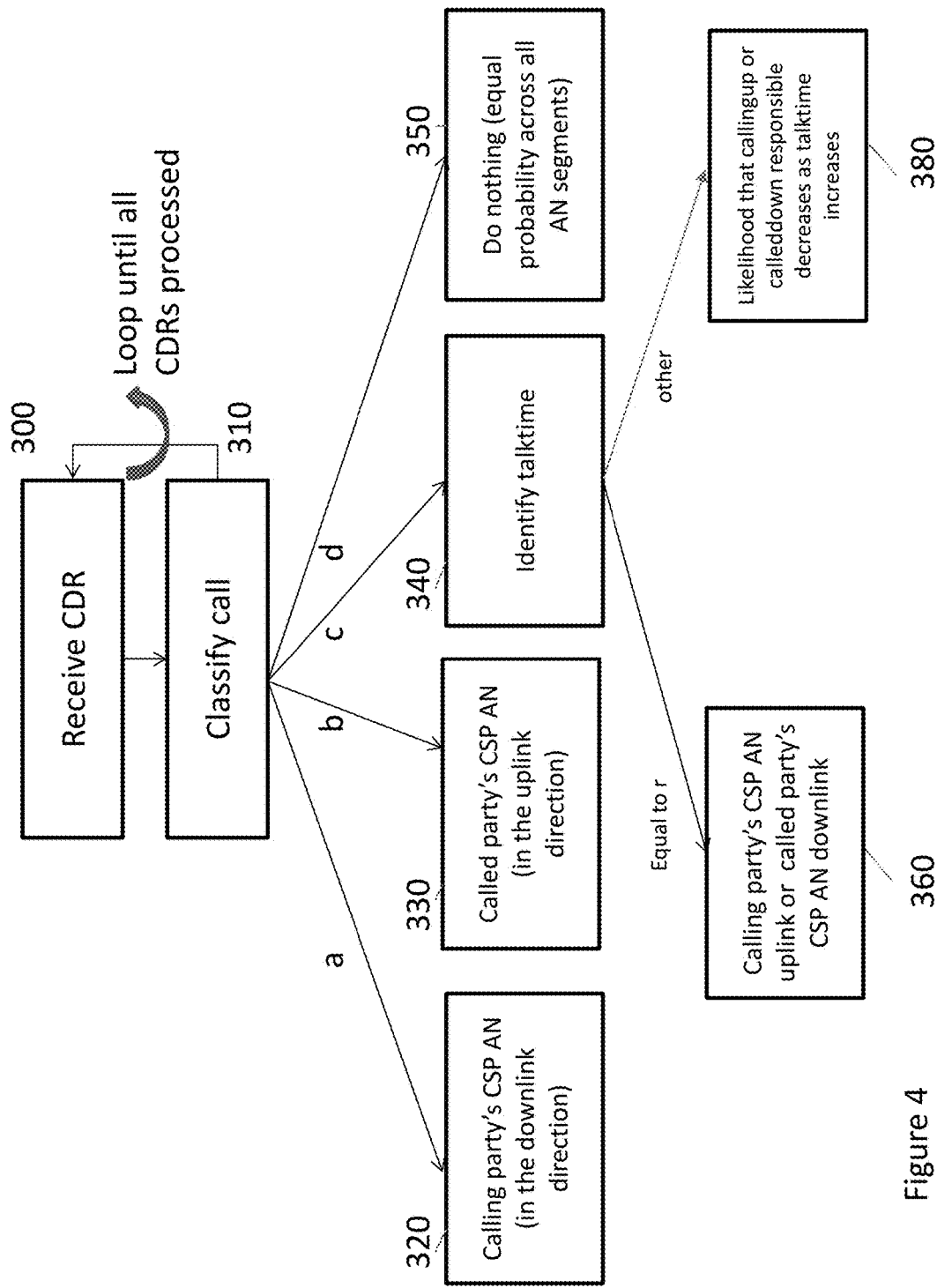
FIG. 4 is a flowchart of a method, in accordance with embodiments of the present invention.

FIG. 2 is a block diagram of an analytics system 100 in accordance with embodiments of the present invention. FIG. 3 is a flowchart of a method, in accordance with embodiments of the present invention. FIG. 4 is a flowchart of a method, in accordance with embodiments of the present invention. Analytics system 100 comprises call monitoring software 110 which includes a call monitor 120. Call monitor 120 monitors a call to identify at step 200 of FIG. 3 one or more parameters which are indicative of call quality. Exemplary parameters are discussed in more detail later.

Briefly however, one indicator of poor call quality is where a call is disconnected early, in such a way as to support a reasonable suspicion that one of the parties abandoned the call. Most of the time, the reason a party would abandon a call would be because of poor audio quality. Even more indicative of poor audio quality would be if one of the parties placed a new call to the other party a very short time later.

Based on the parameter(s) identified, a determination is made by audio quality identifier 130 at step 210 whether call audio quality is likely to be a problem. If the answer is no, then the process loops whilst there are more calls to process.

If poor audio quality is suspected, then in an exemplary embodiment, a CDR is sent to the network segment identifying software 150 by CDR sending component 140 at step 220.

It will be appreciated that the step of monitoring a call to identify parameters indicative of audio quality may actually comprise analyzing a CDR rather than analyzing/monitoring a call directly. Of course, if the call is monitored directly, then the necessary parameter information may be extracted and compiled into a voice call record for forwarding.

Analytics system 100 also comprises, in an exemplary embodiment, the network segment identifying software 110.

In an alternative embodiment, however, software 110 and software 150 are remote from one another.

Software 150 comprises a CDR Receiver 160 which receives, at step 300 of FIG. 4, CDRs or other such call records whether produced by the network or produced external to the network of calls for which it is likely that there is voice quality impairment. CDR Classifier 170 then classifies a call based on the CDR to which the call relates at step 310. The CDR contains information pertinent to the parameters which have been identified as indicative of call quality (e.g. poor audio quality). As mentioned above, a single call may have multiple CDRs associated with the call. Therefore, it may be necessary to correlate and analyze more than one CDR to extract the relevant information. Processing continues to loop until there are no more CDRs to process.

It will be appreciated however that a CDR record may be sent to component 150 regardless of whether poor call quality is suspected and consequently steps 200 and 210 of FIG. 3 could be bypassed altogether.

Classification is as follows:

(a) Calls lasting less than p seconds (e.g. p=7) which were disconnected prior to answer or within q seconds of answer (e.g. q=1). The phrase 'within q seconds' should not be taken to encompass q itself;

(b) Calls disconnected between q seconds after answer, and r seconds after answer (e.g. r=8);

(c) Calls disconnected between seconds after answer and s seconds after answer (e.g. s=20); and (d) All other calls (step 350 FIG. 4).

Note, the parameters such as p, q, r and s may be configurable, and can be tuned based on feedback.

The period between answer and disconnect is the talktime. Wherever a time period is defined as 'between' an upper bound and a lower bound, this should be understood to mean including the lower bound but excluding the upper bound. It should also be appreciated that p, q, r and s are positive real numbers.

In an exemplary embodiment, the following should be true:

$$s>r>q.$$

Because r−q must be long enough for the called party to issue a greeting, r−q can be ≥1 second, and because the typical calling party response to that greeting is to identify themselves and perhaps the subject of the call, one may reasonably conclude that s−r can be ≥3 seconds. In an exemplary embodiment, p can be greater than the configured time for transfer to voicemail in a call-forward-no-answer condition.

Note that the call that is disconnected within a short period of being transferred to voice mail or some other such destination would not be a call that would be considered a suspicious audio quality in the first place.

Each network segment (e.g. each access network) has a probability associated with the network segment, wherein a probability indicates the likelihood that a particular network segment is responsible for the poor audio quality being exhibited by calls passing through that network segment.

Probability biasing component 180 is then able to adjust a probability associated with each network segment based on an analysis of each CDR associated with a call which has been determined to exhibit poor audio quality.

For category (a) calls, the probability is biased to indicate that the calling party's CSP access network 40 is the access network most likely to have introduced the voice quality impairment, and that impairments in the downlink towards the calling user equipment direction 320.

Figure 5:
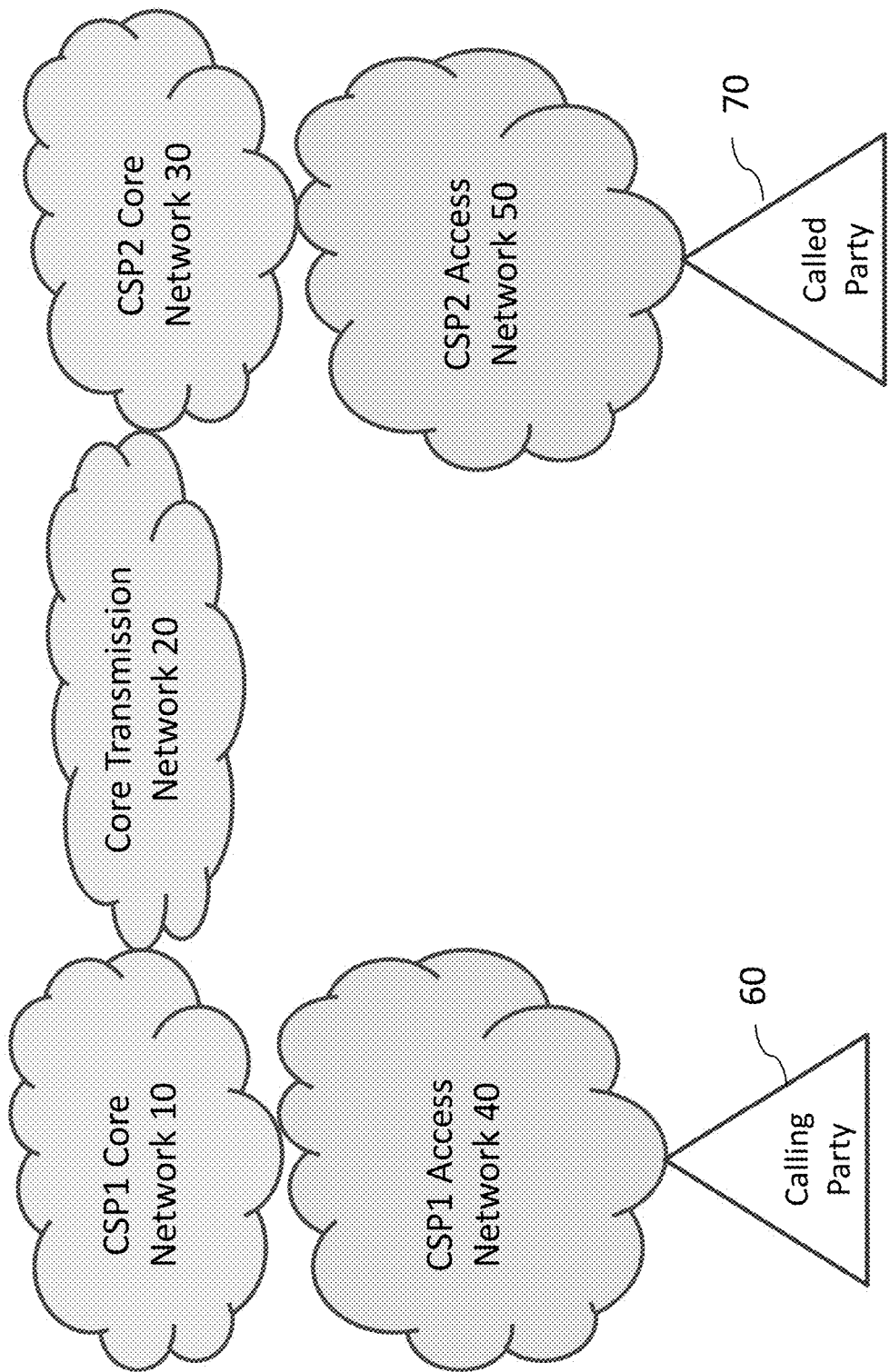
FIG. 5 shows a path through a telephony network and a segment of the path most likely to be responsible for poor audio quality, in accordance with embodiments of the present invention.

For category (a) calls, there is already some evidence or degree of probability of a voice quality impairment on this call based on a known method—e.g. the called party re-attempts the call within a short time period. The value of q is such that the call disconnect being initiated by the human called party is unlikely, and the value of p is such that the call disconnect being a result of the human calling party disconnecting based on the calling party's belief that the called party is unlikely to answer, is also unlikely. Thus, an increased probability can be inferred/calculated that the human calling party disconnected the call due to the human calling party's detection of poor audio quality when the human calling party was listening to the ring-back tone prior to answer. The audio path for this ring-back tone is illustrated in FIG. 5. FIG. 5 shows a path through a telephony network and a segment of the path most likely to be responsible for poor audio quality, in accordance with embodiments of the present invention. Please note the arrows shown in FIG. 5 are purely used to indicate direction of the audio path, wherein the segment of the path represented by broken lines refers to the segment of the path that is most likely responsible for the poor audio quality.

As can be seen, the only access network involved is the access network 40 serving the calling party on the downlink, which means that the access network is likely to be where the audio quality impairment is being introduced.

For category (b) calls, the probability is biased to indicate that the called party's CSP access network 50 is the access network most likely to have introduced the voice quality impairment, and that impairment is in the uplink from the called party's equipment direction 330.

Figure 6:
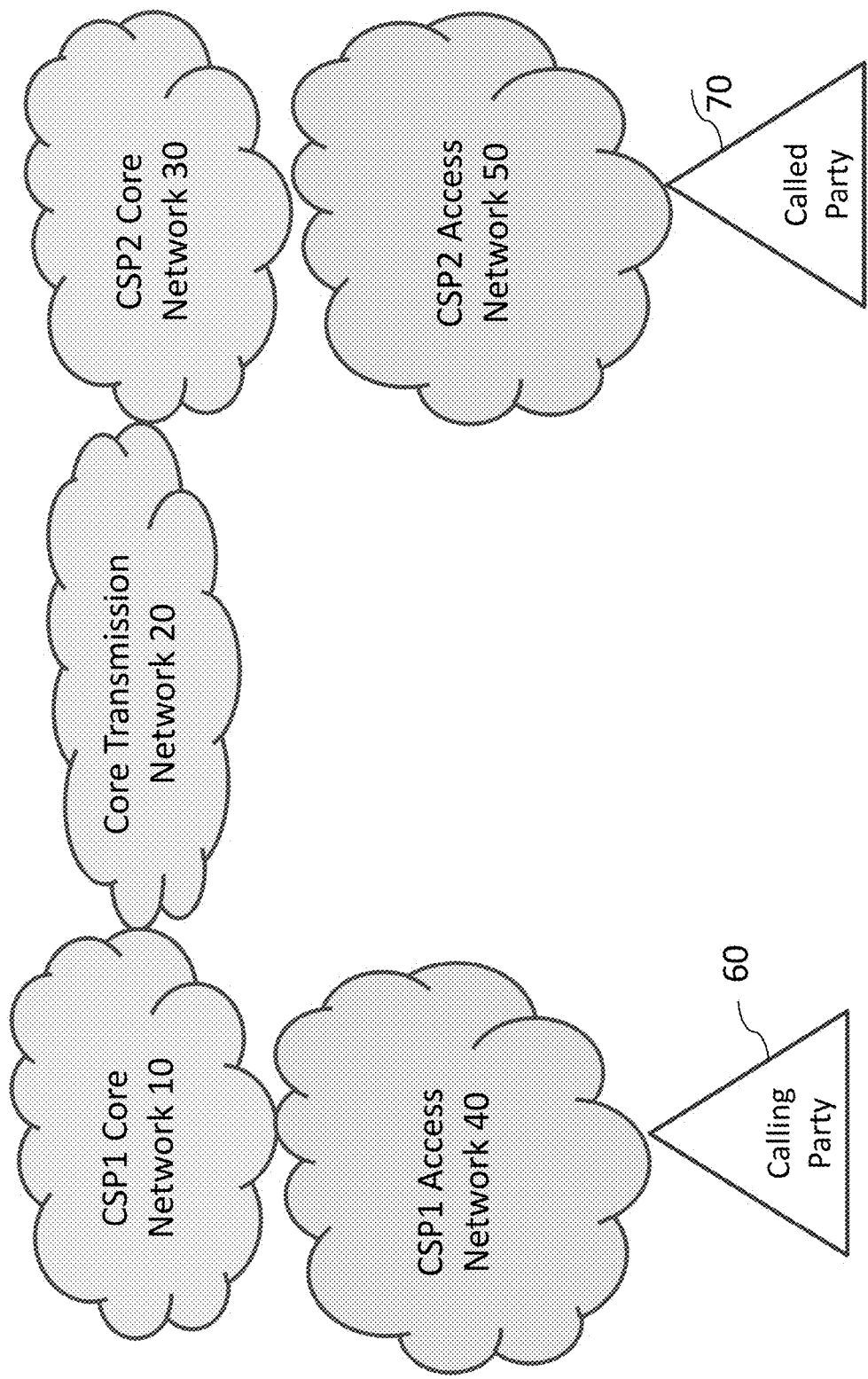
FIG. 6 shows a path through a telephony network and a segment of the path most likely to be responsible for poor audio quality, in accordance with embodiments of the present invention.

For category (b) calls, there is already some evidence or degree of probability of voice quality impairment on this call based on a known method—e.g. one party attempts the call and disconnects within a short time period. The typical post-answer human behaviour is that the called party issues an audio greeting whilst the calling party remains silent whilst they listen for that audio greeting following the calling pasty's perception that the ring-back tone is no longer audible. Consequentially, a call abandoned because of poor voice quality in that period of the call is most likely abandoned because the calling party perceives that the audio greeting from the called party has been impaired en-route. Because the call had not been abandoned prior to this part of the call, an increased probability may be reasonably inferred that the segment of the path added upon call answer and transmitting the called party's greeting—i.e. the uplink through the called party CSP's access network 50 from the called party 70—is where the impairment is occurring, as shown in FIG. 6. FIG. 6 shows a path through a telephony network and a segment of the path most likely to be responsible for poor audio quality, in accordance with embodiments of the present invention, wherein the segment of the path represented by broken lines refers to the segment of the path that is most likely responsible for the poor audio quality. For category (c) calls, the probability is biased to be a function of the talktime 340, such that:

(i) calls with a talktime equal to r, are indicated as being most likely impaired by the calling party's CSP's access network 40 uplink or the called party's CSP's access network 50 downlink (360); and (ii) for other calls, the indication the calling party's CSP's access network 40 uplink (callingup) or the called party's CSP's access network 50 downlink (calleddown) are the likely sources becomes less as talktime becomes greater (380).

Figure 7:
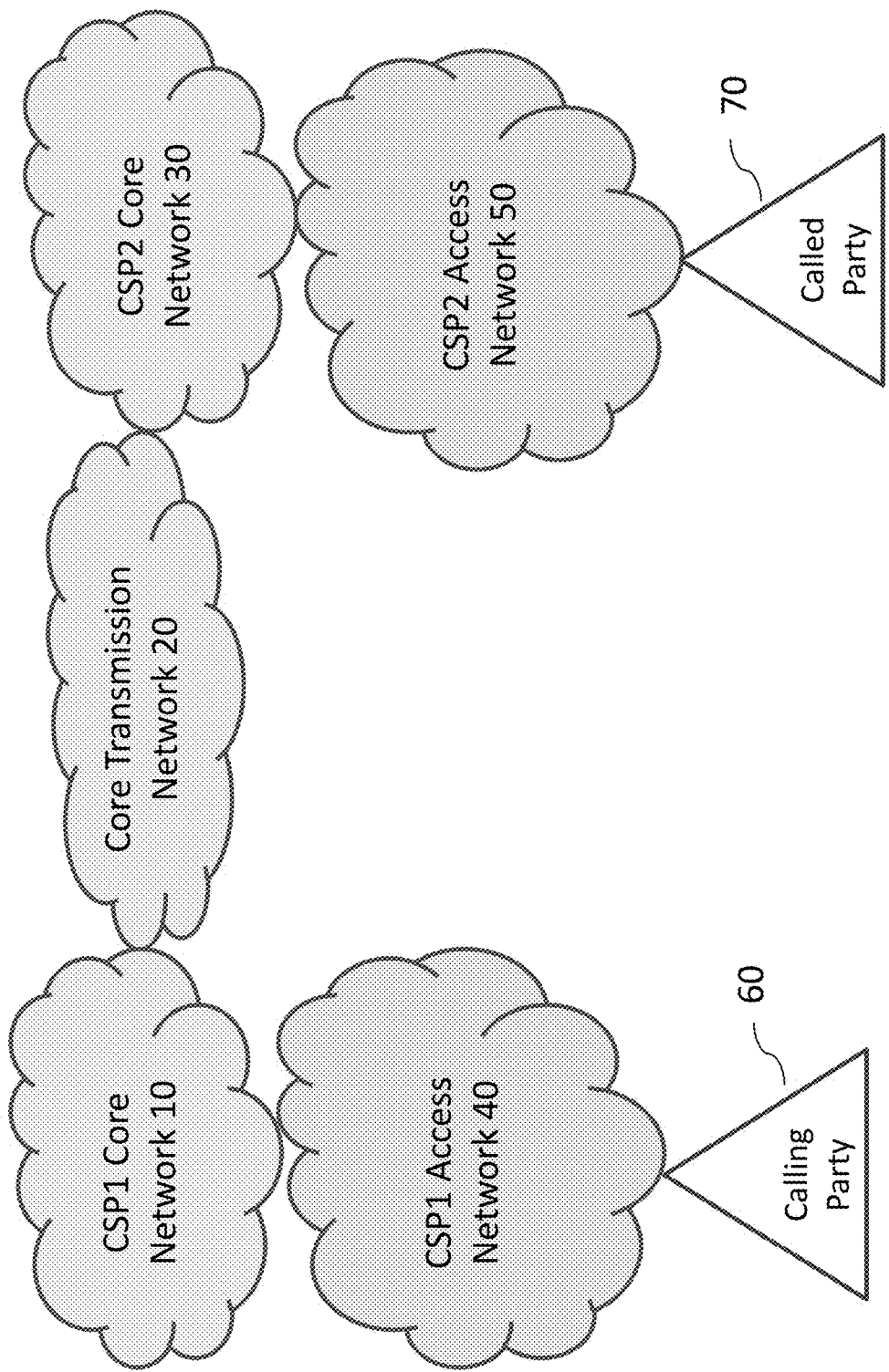
FIG. 7 shows a path through a telephony network and a segment of the path most likely to be responsible for poor audio quality, in accordance with embodiments of the present invention.

For category (c) calls, there is already some evidence or degree of probability of a voice quality impairment on this call based on a known method—e.g. one party attempts to call the other within a short time period. Because the call has gotten this far, there is a decreased probability that the impairment is on the calling party downlink or the called party uplink. And thus the impairment is most likely either on the calling party uplink or the called party downlink. As the call talktime increases further, this inference becomes gradually less confident because some problem could have been introduced in those network segments previously determined to be probably unimpaired, as shown in FIG. 7. FIG. 7 shows a path through a telephony network and a segment of the path most likely to be responsible for poor audio quality, in accordance with embodiments of the present invention. Please note the arrows shown in FIG. 7 are purely used to indicate direction of the audio path, wherein the segment of the path represented by broken lines refers to the segment of the path that is most likely responsible for the poor audio quality.

It should now therefore be appreciated that for most category (c) calls it becomes more difficult to infer where the problem lies as the talktime increases, which is because the determined probability or likelihood that the poor audio quality has been introduced by the calling party's access network uplink or the called party's access network downlink decreases as talktime increases.

Category (d) calls (i.e. calls greater than or equal to s) are indicated as having equal probability across all access network segments, as in step 350.

Based on the logic described above, an overview of which network segment(s) are likely to be responsible for the poor audio quality exhibited by calls passing through such network segments may be obtained. Equally possible is to get a break down on a call-by-call basis. Each call can be classified and an identification can be made as to the likely culprit based on that call classification.

Figure 8:
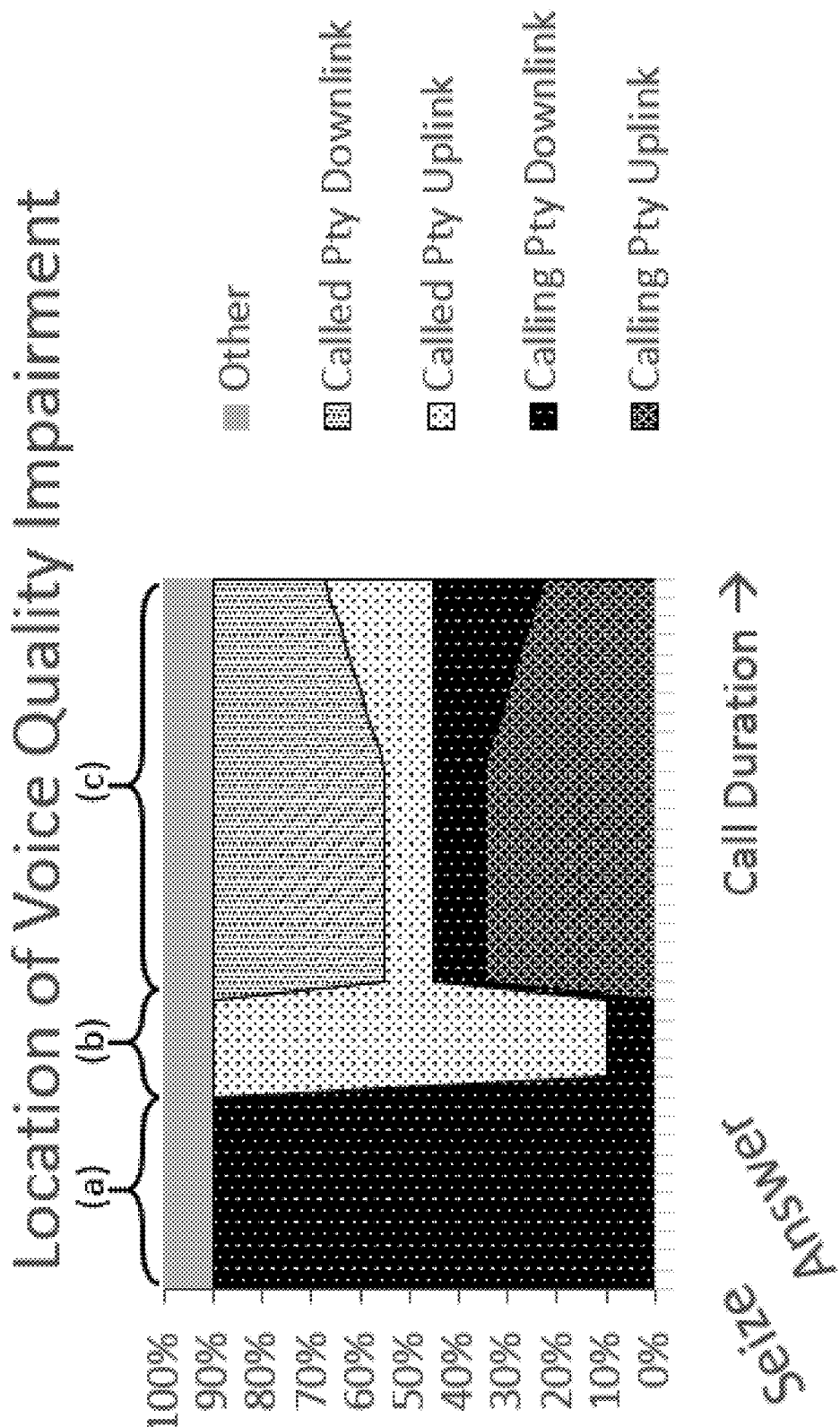
FIG. 8 is a graph illustrating a segment of the path responsible for voice quality impairment, in accordance with embodiments of the present invention.

FIG. 8 is a graph illustrating a segment of the path responsible for voice quality impairment, in accordance with embodiments of the present invention. FIG. 8 provides a visual illustration of the approach discussed supra. They axis of FIG. 8 depicts the probability that a certain network segment is likely to be responsible for poor audio quality. The x axis of FIG. 8 shows the part of the call when disconnect occurred. For example, if the call was disconnected between placement of that call (i.e. seize) a very short period after answer, then there is a 90% chance that the calling party's CSP access network is responsible and that the impairment is in the downlink (i.e. category a) calls). On the other hand, if the call was disconnected within a defined short period after that, then there is a 90% chance that the problem is in the called party uplink (i.e. category b) calls). The categories of call as described herein are listed against the top of the graph for ease of correlation with the description. The graduations on the x axis are not meant to represent any particular length of time but are for illustration purposes only.

Figure 9:
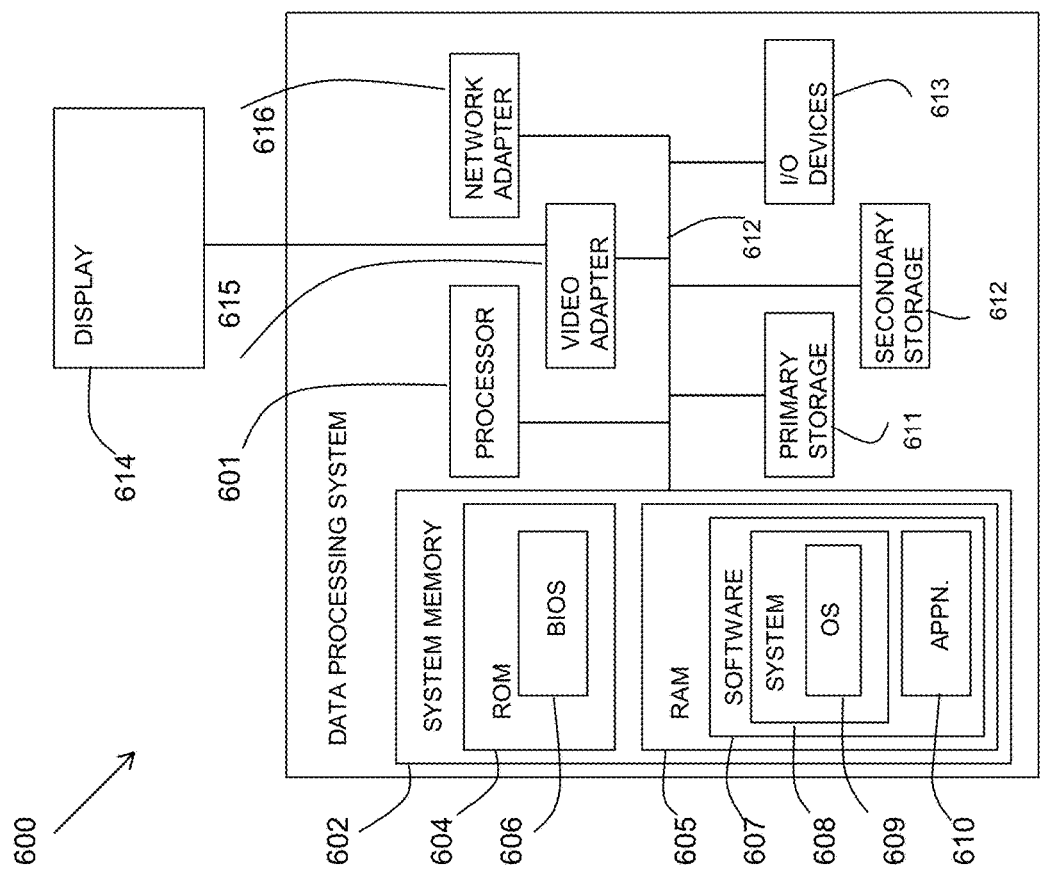
FIG. 9 is a block diagram of a computing system for implementing methods of FIGS. 3-4, in accordance with embodiments of the present invention.

Referring still to the drawings, FIG. 9 is a block diagram of a computing system for implementing methods of FIGS. 3-4, in accordance with embodiments of the present invention. FIG. 9 depicts an exemplary system for implementing embodiments of the invention, which includes a data processing 600 suitable for storing and/or executing program code including at least one processor 601 coupled directly or indirectly to memory elements through a bus system 612. The memory elements may include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. Software 607 may be stored in RAM 605 including system software 608 such as operating system software 609. Software applications 610 may also be stored in RAM 605.

The system 600 may also include a primary storage means 611 such as a magnetic hard disk drive and secondary storage means 612 such as a magnetic disc drive and an optical disc drive. The drives and associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 may be coupled to the system either directly or through intervening I/O controllers. A user may enter commands and information into the system 600 through input devices such as a keyboard, pointing device, or other input devices (e.g., microphone, joy stick, game pad, satellite dish, scanner, or the like). Output devices may include speakers, printers, etc. A display device 614 is also connected to system bus 603 via an interface, such as video adapter 615.

The present invention may be a (computer) system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for determining a probability that a particular network segment in a telephony network is responsible for poor audio quality associated with a telephone call being transmitted over the telephony network, the method comprising:
identifying, by a processor of a computing system, a plurality of parameters associated with a telephone call, wherein the plurality of parameters are indicative of audio quality;
calculating, by the processor, a probability that a particular network segment is responsible for poor audio quality associated with the telephone call based on the plurality of parameters, wherein the probability that a particular network segment is responsible for the poor audio quality associated with the telephone call is a function of at least one of: i) a duration of the call, and ii) a call disconnect time relative to a call answer time;
biasing, by the processor, the probability:
for a first category of calls to indicate that a calling party's access network downlink is most likely to have introduced the poor audio, wherein the processor infers that a human calling party disconnected the call due to the human calling party's detection of poor audio quality, such that the only network segment involved is the calling party's access network downlink serving the calling party;
for a second category of calls to indicate that the called party's access network uplink is most likely to have introduced the poor audio quality, wherein the processor infers that the call is abandoned because the calling party perceives that the audio greeting from the called party has been impaired en-route, and the called party's access network uplink is responsible because the called party's access network uplink is the network segment that has been added upon a call answer and transmitting the called party's greeting;
for a third category of calls to indicate that the calling party's access network uplink or the called party's access network downlink is most likely to have introduced the poor audio quality; and
classifying, by the processor, a call according to which network segment is responsible for the poor audio quality associated with the telephone call.

2. The method of claim 1, wherein the step of identifying a plurality of parameters comprises analyzing at least one voice call record associated with the call.

3. The method of claim 1, wherein the first category of calls are calls lasting less than p seconds which was disconnected prior to answer or within q seconds of answer.

4. The method of claim 1, wherein the second category of calls are calls disconnected between q seconds after answer and r seconds after answer where r is greater than q.

5. The method of claim 1, wherein the third category of calls are calls disconnected between r seconds after answer and s seconds after answer, wherein the probability is a function of call talktime.

6. The method of claim 5, further comprising:
biasing, by the processor, the probability for a call having talktime equal to r to indicate that the calling party's access network uplink or the called party's access network downlink is most likely to have introduced the poor audio quality.

7. The method of claim 5, further comprising:
biasing, by the processor, the probability to indicate that a likelihood that the poor audio quality has been introduced by the calling party's access network uplink or the called party's access network downlink decreases as talktime increases.

8. A computer system comprising:
a processor;
a memory device coupled to the processor; and
a computer readable storage device coupled to the processor, wherein the storage device contains program code executable by the processor via the memory device to implement a method for determining a probability that a particular network segment in a telephony network is responsible for poor audio quality associated with a telephone call being transmitted over the telephony network, the method comprising:
identifying, by a processor of a computing system, a plurality of parameters associated with a telephone call, wherein the plurality of parameters are indicative of audio quality;
calculating, by a processor, a probability that a particular network segment is responsible for poor audio quality associated with the telephone call based on the plurality of parameters, wherein the probability that a particular network segment is responsible for the poor audio quality associated with the telephone call is a function of at least one of: i) a duration of the call, and ii) a call disconnect time relative to a call answer time;
biasing, by the processor, the probability:
for a first category of calls to indicate that a calling party's access network downlink is most likely to have introduced the poor audio, wherein the processor infers that a human calling party disconnected the call due to the human calling party's detection of poor audio quality, such that the only network segment involved is the calling party's access network downlink serving the calling party:
for a second category of calls to indicate that the called party's access network uplink is most likely to have introduced the poor audio quality, wherein the processor infers that the call is abandoned because the calling party perceives that the audio greeting from the called party has been impaired en-route, and the called party's access network uplink is responsible because the called party's access network uplink is the network segment that has been added upon a call answer and transmitting the called party's greeting:
for a third category of calls to indicate that the calling party's access network uplink or the called party's access network downlink is most likely to have introduced the poor audio quality, and
classifying, by the processor, a call according to which network segment is responsible for the poor audio quality associated with the telephone call.

9. The computer system of claim 8, wherein the identifying the plurality of parameters includes analyzing at least one voice call record associated with the call.

10. The computer system of claim 8, wherein the first category of calls are calls lasting less than p seconds which was disconnected prior to answer or within q seconds of answer.

11. The system of claim 8, wherein the second category of calls are calls disconnected between q seconds after answer and r seconds after answer where r is greater than q.

12. The computer system of claim 8, wherein the third category of calls are calls disconnected between r seconds after answer and s seconds after answer, wherein the probability is a function of call talktime.

13. The computer system of claim 12, further comprising:
biasing, by the processor, the probability for a call having talktime equal to r to indicate that the calling party's access network uplink or the called party's access network downlink is most likely to have introduced the poor audio quality.

14. The computer system of claim 12, further comprising:
biasing, by the processor, the probability to indicate that the likelihood that the poor audio quality has been introduced by the calling party's access network uplink or the called party's access network downlink decreases as talktime increases.

15. A computer program product, comprising a computer readable hardware storage device storing a computer readable program code, the computer readable program code comprising an algorithm that when executed by a computer processor of a computing system implements a method for determining a probability that a particular network segment in a telephony network is responsible for poor audio quality associated with a telephone call being transmitted over the telephony network, the method comprising:
identifying, by a processor of a computing system, a plurality of parameters associated with a telephone call, wherein the plurality of parameters are indicative of audio quality;
calculating, by a processor, a probability that a particular network segment is responsible for poor audio quality associated with the telephone call based on the plurality of parameters, wherein the probability that a particular network segment is responsible for the poor audio quality associated with the telephone call is a function of at least one of: i) a duration of the call, and ii) a call disconnect time relative to a call answer time;
biasing, by the processor, the probability:
  for a first category of calls to indicate that a calling party's access network downlink is most likely to have introduced the poor audio, wherein the processor infers that a human calling party disconnected the call due to the human calling party's detection of poor audio quality, such that the only network segment involved is the calling party's access network downlink serving the calling party;
  for a second category of calls to indicate that the called party's access network uplink is most likely to have introduced the poor audio quality, wherein the processor infers that the call is abandoned because the calling party perceives that the audio greeting from the called party has been impaired en-route, and the called party's access network uplink is responsible because the called party's access network uplink is the network segment that has been added upon a call answer and transmitting the called party's greeting;
  for a third category of calls to indicate that the calling party's access network uplink or the called party's access network downlink is most likely to have introduced the poor audio quality; and
classifying, by the processor, a call according to which network segment is responsible for the poor audio quality associated with the telephone call.

16. The computer program product of claim 15, wherein identifying the plurality of parameters comprises analyzing at least one voice call record associated with the call.

* * * * *